United States Patent [19]
Ohkawa

[11] Patent Number: 5,125,104
[45] Date of Patent: Jun. 23, 1992

[54] ELECTROMAGNETIC PULSE GENERATOR FOR USE WITH EXPLODING MATERIAL

[75] Inventor: Tihiro Ohkawa, La Jolla, Calif.

[73] Assignee: General Atomics, San Diego, Calif.

[21] Appl. No.: 521,194

[22] Filed: May 9, 1990

[51] Int. Cl.$^5$ .............................................. H04B 1/034
[52] U.S. Cl. ........................................ 455/98; 102/209
[58] Field of Search ................ 342/450, 126; 102/513, 102/200; 455/98

[56] References Cited

U.S. PATENT DOCUMENTS

| | | | |
|---|---|---|---|
| 2,889,776 | 6/1959 | Gunther | 102/209 |
| 3,335,239 | 8/1967 | Fey | 455/98 |
| 4,335,655 | 6/1982 | Lofgren | 102/209 |

Primary Examiner—Theodore M. Blum
Attorney, Agent, or Firm—Fitch, Even, Tabin & Flannery

[57] ABSTRACT

A compact transmitting device located in an exploding projectile transmits an RF pulse upon explosion of the projectile. Receipt of the RF pulse, through triangulation or equivalent techniques, identifies the burst point of the projectile. The transmitting device comprises a magnetic circuit that includes a permanent magnet, a ferromagnetic core having an air gap some distance from the permanent magnet, and a coil in the air gap. Stored energy in the permanent magnet is converted into a high power electrical pulse when the permanent magnet is destroyed. Prior to destruction of the magnet, a constant high magnetic flux exists in the air gap, but induces no current in the coil because it is a constant flux. Upon destruction of the permanent magnet, the magnetic flux changes rapidly, causing a high power electrical pulse to be generated. This high power electrical pulse may be used in a broad band spark transmitter or used to power a narrow band transmitter, causing the location-identifying RF pulse to be generated. In one embodiment, the power of the electrical pulse is increased by charging a capacitor, followed by a very short discharge of the capacitor.

9 Claims, 2 Drawing Sheets

ELECTROMAGNETIC PULSE GENERATOR FOR USE WITH EXPLODING MATERIAL

BACKGROUND OF THE INVENTION

The present invention relates to electromagnetic tracers, and more particularly to a compact electromagnetic tracer suited for use in an exploding projectile, e.g., on an exploding projectile used on a battle field. The tracer transmits a high power RF pulse at the impact or explosion point of the projectile. Such high power RF pulse advantageously allows the impact location of the projectile to be electronically determined, e.g., through triangulation, without the need for risk forward observers, or expensive radar tracking systems.

Many exploding projectiles used on a battle field are launched some distance from the battlefield. There is thus a need to determine the impact location of such projectiles so that, as required, corrections can be made to the trajectory of subsequently launched projectiles in order to hit a desired target. One technique commonly used to determine the impact location of an exploding projectile is to place observers within visual distance of the battle field, which observers are in radio contact with the projectile launch site. Through observation, the observers radio information back to the launch site indicating how close the impact location was to a desired target. Appropriate corrections can then be made as subsequent projectiles are launched so that such are guided along a trajectory leading to the desired target. Unfortunately, depending on the terrain of the battle field, such observers must frequently be forward on the battle field in order to accurately observe the impact location, thereby placing such observers at risk. What is needed, therefore, is an impact-location determining technique that avoids the use of risk forward observers.

One method known in the art that avoids the use of risk forward observers is to track the exploding projectile with radar systems, or equivalent. Unfortunately, such tracking systems are extremely expensive to manufacture, operate, and maintain. Further, depending upon the terrain of the battle field, such radar tracking systems may not always produce reliable results. It is thus apparent that what is needed is an inexpensive and reliable method of determining the impact location of an exploding projectile.

SUMMARY OF THE INVENTION

The present invention addresses the above and other needs by providing a compact and inexpensive transmitting device that is located in an exploding projectile. Large amounts of energy are stored in the transmitting device. Such energy is released upon the explosive destruction of the projectile, and this released energy powers the transmission of a location-identifying radio frequency (RF) pulse. Advantageously, the RF pulse is then received and used, e.g., through conventional triangulation techniques, to identify the burst point of the projectile.

The transmitting device of the present invention is referred to as an "electromagnetic tracer." It comprises a magnetic circuit that includes a permanent magnet, a ferromagnetic core having an air gap some distance from the permanent magnet, and a coil in the air gap. Stored energy in the permanent magnet is converted into a high power electrical pulse when the permanent magnet is explosively destroyed. Prior to destruction of the magnet, a constant high magnetic flux density exists in the air gap, but induces no current or voltage in the coil because it is a constant magnetic flux. Upon destruction of the permanent magnet, the magnetic flux density changes rapidly, causing a high power electrical pulse to be generated. This high power electrical pulse may be used in a broad band spark transmitter, or used to power a narrow band transmitter. The coil is located some distance from the magnet. Hence, the RF pulse is generated and transmitted prior to destruction of the magnetic circuit.

Various embodiments of the present invention emphasize different aspects thereof, resulting in numerous applications wherein the invention may be used. One embodiment, for example, provides an electromagnetic tracer as above described that finds primary applicability in tracing exploding projectiles. Another embodiment provides a high power RF pulse generator. A still further embodiment provides a system for locating an impact location of an explosive projectile. Yet another embodiment contemplates a method of generating a high power RF pulse upon the triggering of an explosive source. Each of these embodiments are briefly summarized below.

It is noted that in some embodiments; the power of the electrical pulse generated may be increased by using it to charge a capacitor, followed by a very short discharge of the capacitor. One embodiment includes a magnet having explosive material interspersed with the magnetic material. Such explosive/magnet composite advantageously decreases the time required to destroy the magnetic properties, thereby increasing the available output power.

The electromagnetic tracer embodiment of the invention comprises: (1) a permanent magnet; (2) a ferromagnetic core magnetically coupled to the permanent magnet, this ferromagnetic core having an air gap spaced a prescribed distance from the permanent magnet, there being a constant magnetic flux density existing in the air gap; (3) a coil positioned in the air gap such that the magnetic flux density flows therethrough, an electrical potential and current being induced in the coil only when the magnetic flux density changes; and (4) transmitting means coupled to the coil for quickly transmitting an RF pulse in response to a change in the magnetic flux density. In operation of this electromagnetic tracer, the destruction of the permanent magnet causes the magnetic flux density flowing through the coil to rapidly change. This rapid change in magnetic flux density induces a voltage and current in the coil. The power associated with this induced voltage and current is used to generate and transmit the RF pulse. The RF pulse, once generated, signals the destruction of the permanent magnet, and can thus be used to provide an indication of the location of the permanent magnet at the time of its destruction.

The high power RF pulse generator embodiment of the invention is primarily adopted to be carried by an explosive projectile, or equivalent device, that carries a triggerable source of explosive force. This embodiment includes: (1) means for storing electromagnetic energy at a location near the source of explosive force; (2) means for releasing the electromagnetic energy with a shock wave created by the triggering of the explosive force; and (3) transmitting means powered by the released electromagnetic energy for transmitting an RF pulse, this transmitting means being located farther from the source of explosive force than the stored electromagnetic energy. Because the release of electromagnetic energy occurs during the transit time of the shock wave, the powered pulse generator, being more distant from the source of explosive force than is the stored electromagnetic energy, is able to generate and transmit the high power RF pulse prior to its destruction by the shock wave.

The system for locating an impact location of an explosive projectile, in accordance with one embodiment of the invention, includes: (1) means for launching the explosive projectile towards a desired impact area, the explosive projectile including means for triggering an explosive source carried thereon when the projectile is at or near its impact location; (2) electromagnetic tracer means carried by the explosive projectile for transmitting a high energy RF pulse upon the explosive destruction of the explosive projectile; (3) means for receiving and detecting the high energy RF pulse at a plurality of separate and distinct receiving locations remote from the impact area; and (4) means for determining an impact location within the impact area based upon the detection of the high energy RF pulse at each of the plurality of receiving locations.

Finally, the method of generating a high power RF pulse upon the triggering of an explosive source in accordance with yet another embodiment of the invention includes: (a) storing electromagnetic energy at a location that is proximate the explosive source; (b) releasing the electromagnetic energy with energy made available upon the triggering of the explosive source; and (c) powering a pulse generator, positioned more distant from the explosive source than is the stored electromagnetic energy, with the released electromagnetic energy prior to the explosive destruction of the pulse generator by the energy released from the explosive source.

It is a feature of the present invention to provide an electromagnetic tracer wherein large amounts of energy may be stored for an indefinite period of time, which stored energy is released upon the explosive destruction of the electromagnetic tracer, and which released energy is used to power the transmission of an RF pulse. This RF pulse may be used to signal the occurrence and location of such explosive destruction.

Another feature of the invention provides such an electromagnetic tracer wherein the RF pulse may be transmitted using either a broad or narrow band transmitter.

A still further feature of the invention provides such an electromagnetic tracer wherein the electromagnetic power released upon its explosive destruction is sufficiently large to destroy other RF receivers in the burst vicinity.

A further feature of the invention provides such an electromagnetic tracer that is inexpensive to make, compact in its construction, and simple and reliable in its operation, thereby facilitating its use in an explosive projectile where it is only used once prior to being destroyed.

Yet, another feature of the invention provides a simple, inexpensive and reliable method or technique for determining the impact location of an exploding projectile without the need for risk forward observers.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
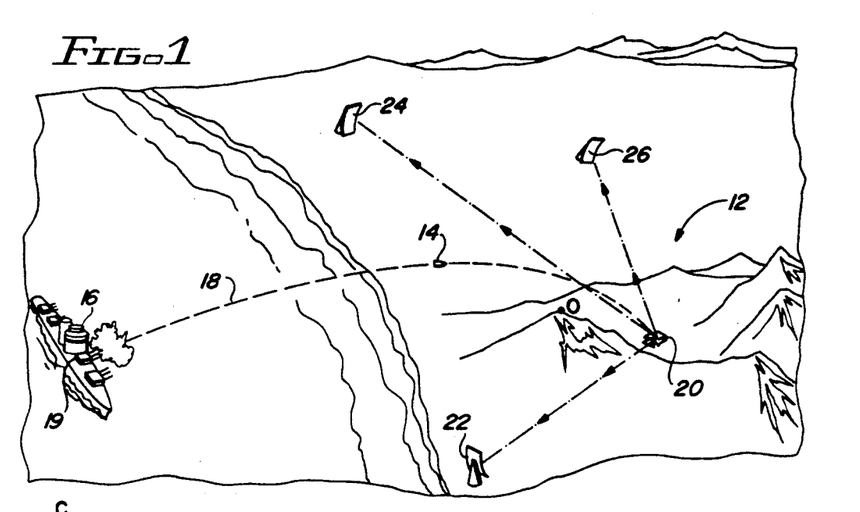
FIG. 1 depicts a battlefield and schematically illustrates how the present invention may be used to identify an impact location of an exploding projectile on the battlefield.

The present invention relates to an electromagnetic tracer device that releases stored electromagnetic energy upon its destruction, which released energy takes the form of a high power radio frequency (RF) pulse. FIG. 1 schematically depicts a preferred manner in which such an invention may be used. FIG. 1 shows a battlefield 12 towards which an exploding projectile 14 is launched from a battleship 16 located some distance (e.g. many miles) from the battlefield 12. The exploding projectile 14 is typically of a large caliber and includes sufficient explosives therein to create a desired destructive explosion upon impact. Some types of exploding projectiles include "fuses" to sense when the projectile is a prescribed distance from impact, e.g. a few feet, and to trigger the explosion at that time, thereby expanding the effective area subjected to the resulting shock wave. Other projectiles include trigger mechanisms that trigger the explosion at impact.

The projectile follows a trajectory 18 as controlled by a launch mechanism 19 located on board the ship 16. In order to guide the projectile to a desired target location 20 at the battlefield 12, some means is required for notifying those at launch location 16 of the impact location of a first projectile, so that appropriate corrections can be made in the trajectory of subsequent projectiles. Heretofore, a forward observer "O", in visual contact with the battlefield 20, has been used for this purpose. Such observer would visually observe the impact location of a fired projectile, and radio this location back to the ship, or other launch location. Based on this information, corrections could be made to the trajectories of projectiles fired subsequently. In this way, the trajectories 18 are adjusted as required in order to "zero in" on a desired target. Unfortunately, as mentioned previously, such forward observer "O" is necessarily at risk because of his proximity to the battlefield.

Advantageously, in accordance with one application of the electromagnetic tracer of the present invention, the need for a risk forward observer "O" is eliminated. This is because the electromagnetic tracer, which is carried in each exploding projectile 14, emits a high power RF pulse or burst of energy upon the explosive destruction of the projectile. This high power RF pulse may be received by a plurality of receiving stations, e.g., 22, 24, and 26, located remote from the battlefield 12. For many applications, it is possible that at least one such remote receiving station may be located at the same location as the launch site, e.g., on the ship 16. Upon receipt of the RF pulse or burst at the receiving stations 22, 24, and/or 26, The impact location can be readily determined using conventional triangulation, or equivalent, techniques.

It is to be noted that while a battleship 16 is shown in FIG. 1 as the source of the exploding projectile 18, this is only exemplary. The exploding projectile 14 may originate from numerous sources, such as a tank, an airplane, a submarine, or similar devices. Alternatively, for some applications, the projectile 14 may include its own source of propulsion, such as a missile that is launched from an appropriate missile launcher.

Figure 2:
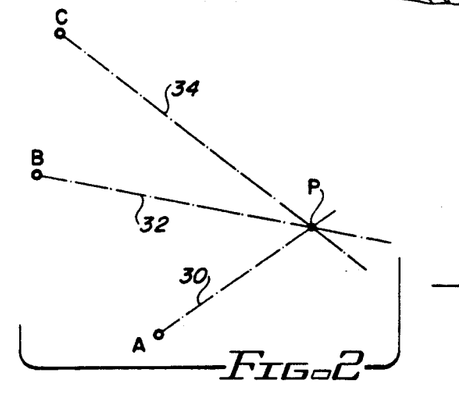
FIG. 2 diagrammatically illustrates the concept of triangulation.

FIG. 2 diagrammatically illustrates the concept of triangulation. This technique, which allows the location of a transmitted signal to be determined, is well known in the art and will not be explained in great detail here. The concept of triangulation involves the use of directional antennas, e.g., located at points "A", "B", and "C". Simply stated, each directional antenna, upon receipt of an RF transmission, determines the relative coordinates of an RF source, e.g., located at point "P", from which the transmission originated. Thus, for example, it is possible to determine at antenna location "A" that the source of the RF transmission "P" lies in the direction of the dashed line 30. This line 30, and others like it, is referred to herein as a directional line. Similarly, it is possible to determine that the source P lies in the direction of the directional lines 32 and 34 from antennas "B" and "C", respectively. The intersection of these directional lines thus provides an identification of the location of the point P. While only two antennas are theoretically required in order to identify a source location (the intersection of two directional lines defining the source point), it is desirable to use more than two antennas where possible, particularly if the source "P" is moving and if the source point "P" could reside within more than one plane.

Where the RF source "P" is a continuous source, the directional lines 20, 32, and 34 may be determined by simply rotating the directional antennas to find an orientation that provides a maximum signal. Where only a single RF burst is received, it is still possible, using appropriate antenna arrays (which arrays may be part of a single antenna receiving station) to ascertain the direction from which the RF burst energy is received.

By sending the directional information obtained at each antenna location to a computer located at a central processing station, which computer is preferably located at the launch site of the exploding projectile 14, the coordinates of the location "P" may be determined quickly and accurately. These coordinates may then be used to adjust the trajectory of the next fired projectile, if necessary. Further, if desired, conventional techniques can be used to display the impact location on a suitable display surface that incorporates an overlay of the battle field 12. In this way, personnel at the launch site may be visually appraised of the impact locations of the various projectiles that are launched.

Figure 3A:
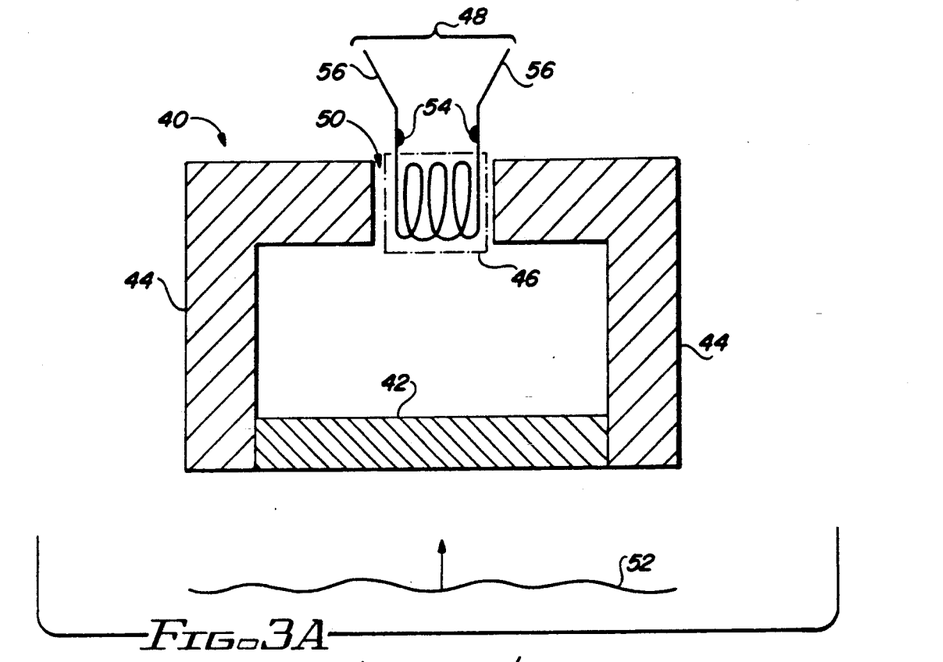
FIG. 3A is a schematic block diagram of an electromagnetic tracer made in accordance with the present invention.

Referring next to FIG. 3A, a schematic block diagram of an electromagnetic tracer 40 made in accordance with one embodiment of the present invention is illustrated. The tracer 40 includes a strong permanent magnet 42, a ferromagnetic core 44, a coil 46, and a transmitter 48. The ferromagnetic core 44 includes an air gap 50 in which the coil 46 is positioned. The magnet 42 and the ferromagnetic core 44 form a magnetic circuit. The air gap 50 is positioned some distance from the magnet 42. The magnetic circuit thus formed directs a high, but constant, magnetic flux density through the air gap 50. This magnetic flux also passes through the turns of the coil 46. However, so long as the magnetic circuit is not disturbed, no electrical current is induced in the coil 46, nor is an electrical potential developed across the coil 46, because the magnetic flux in the air gap 50 remains constant.

A shock wave, represented schematically in FIG. 3A as the wavy line 52, e.g., created by the explosion of the projectile 14, destroys the permanent magnet 14 and disrupts the magnetic circuit. Such disruption causes the high magnetic flux present in the air gap 50 to rapidly reduce to zero. Such rapid change in the magnetic flux induces a large voltage and current in the coil 46. The power contained in this inducted voltage and current causes the transmitter 48 to generate and transmit a high power burst of RF energy. This high power burst of RF energy thus signals the explosive destruction of the device.

Advantageously, because the shock wave 52 travels relatively slow compared with electromagnetic transmission times, the coil 46 and transmitter 48 are able to perform their functions of converting the energy available in the rapidly decreasing magnetic flux to the desired high power RF burst prior to their destruction by the shock wave 52. In this way, the energy contained within the shock wave 52 that explosively destroys the projectile in which the electromagnetic tracer is carried, also releases the stored electromagnetic energy held in the magnetic circuit. This released energy then provides the power necessary for generating and transmitting the location-identifying high power RF pulse.

Figure 4:
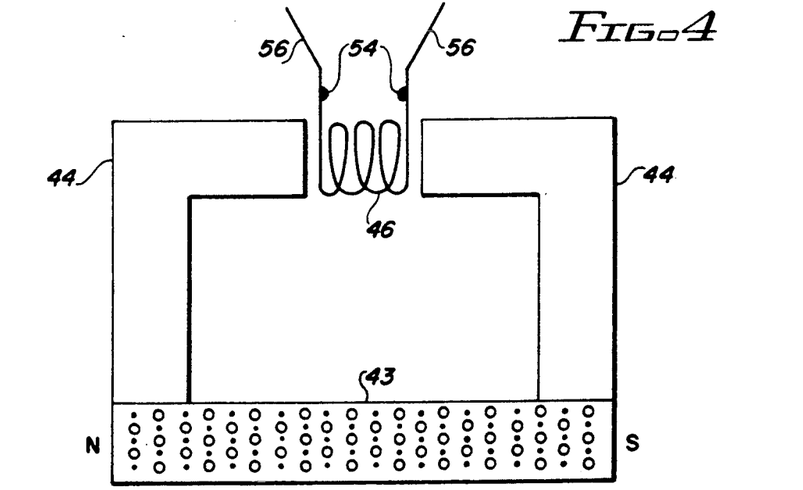
FIG. 4 is a schematic block diagram of an alternative embodiment of an electromagnetic tracer made using a composite magnet/explosive material.

An alternative embodiment of the invention, shown in FIG. 4, uses a composite magnet/explosive 43, rather than a magnet 42 positioned near a shock wave 52. (Magnetic particles are symbolically depicted in FIG. 4 as small ovals, while explosive particles are symbolically depicted as dots.) Hence, the shock wave that destroys the composite magnet/explosive 43 emanates from within the magnet 43 thereby destroying its magnetic properties in a shorter time than if destroyed with an external shock wave. As explained below, this provides greater output power for the RF pulse.

It is noted that the primary method of destroying the magnetic field for the embodiment shown in FIG. 4 is not the physical "blowing apart" of the magnetic particles, but is rather the raising of the magnetic material's temperature above their Curie point (320° C. for NdFeB). For an explosion originating within the magnet itself, this raising of temperature occurs very rapidly.

The permanent magnet 42 is preferably realized using a strong permanent magnet material, such as NdBFe. Such magnets may be obtained commercially as either sintered solid or powder molded in plastic. For the embodiment of FIG. 4, explosive powder is mixed with the permanent magnet material.

The ferromagnetic core 44 has a large $\mu$ value and a high electrical resistivity. It may be constructed of a bundle of insulated soft iron wires or soft iron powder, bonded in a plastic matrix. The geometry of the core 44 may take any suitable form that minimizes magnetic loses, and that places the air gap 50 some distance from the permanent magnet.

The transmitter 48 may take several forms. The form shown in FIG. 3A includes the coil 46, a spark gap transmitter 54 and antennae 56. Such may be of conventional design.

Figure 3B:
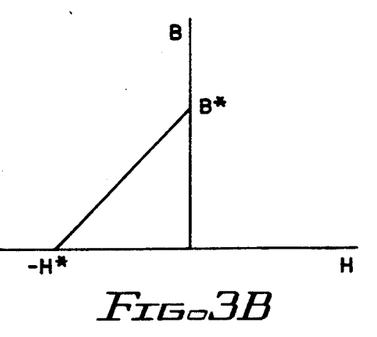
FIG. 3B depicts the preferred magnetic characteristics of the permanent magnet material used within the electromagnetic tracer of FIG. 3A.

Assuming that the permanent magnet material is NdBFe, either sintered or bonded, with or without explosive material interspersed therein, having magnetic characteristics substantially as shown in FIG. 3B, analysis of the magnetic circuit, including its explosive destruction, proceeds as follows. The sintered material and the bonded material have $B^* \approx 1.1$ T and $B^* \approx 0.6$ T, respectively, where T is the unit Telsa. In both cases, $H^* \approx \mu_0^{-1} B^*$. The respective electrical resistivities are $1.4 \times 10^{-6}$ $\Omega$-meter and $1.8 \times 10^{-4}$ $\Omega$-meter.

The equations for the magnetic circuit are $$H_1 l_1 + H_2 l_2 0 \tag{1}$$

$$B_1 = B_2 \tag{2}$$

where the subscript 1 and 2 denote the quantities in the gap 50, and in the permanent magnet 42 and ferromagnetic core 44; and l is the length of each respective path. The characteristics shown in FIG. 3B are represented by $$B_2 = B^*(1 + H_2/H^*) \tag{3}$$

Substituting Equation (1) into Equation (3), one obtains $$B_1 = B^*\left(1 + \frac{B^*}{\mu_0 H^*} \frac{l_1}{l_2}\right) \tag{4}$$

When the detonation front (shock wave 52) reaches the permanent magnet 42, the magnet is destroyed in the transit time $\tau$ of the shock wave across the width w of the magnet. That is, $$\tau = w/u \tag{5}$$

where u is the velocity of the shock wave. For $w = 5 \times 10^{-2}$ m and $u = 5 \times 10^3$ m/sec, the transit time is $10^{-5}$ sec. Where the shock wave emanates from within the magnet, the magnet is destroyed in a shorter time. The magnetic field B at the gap decays as $$B = B_1(1 - t/\tau) \tag{6}$$

If the coil 46 has N turns, the open circuit voltage $V_0$ is given by $$V_0 = N B_1 S/\tau \tag{7}$$

where S is the cross-sectional area of the coil. For $B_1 = 0.5$ T, $S = 2.5 \times 10^{-3}$ m$^3$ (2 in $\times$ 2 in) and $\tau = 10^{-5}$ sec, it is thus seen that $V_0 = 125N$ volts. If $\tau$ is less than $10^{-5}$ sec.(as is the case when a composite magnet/explosive is used, as in FIG. 4), then $V_0$ is even higher.

If the coil 50 is connected to a resistive load R, the circuit equation is given by $$V = L\frac{dI}{dt} + IR \tag{8}$$

where V is the voltage across the coil, L is the self and leakage inductance of the coil, and I is the current. Solving for the current, I, Equation (8) becomes $$I = \frac{V_0}{R}[1 - \exp(-Rt/L)] \quad 0 \leq t \leq \tau \tag{9}$$

The power P delivered to the load is given by $$P = I^2 R = \frac{V_0^2}{R}[1 - \exp(-Rt/L)]^2 \tag{10}$$

The total energy W delivered to the load is $$W = \int_0^\tau P dt = \frac{V_0^2}{R}\left(\tau - \frac{2L}{R}[1 - e^{-(R/L)\tau}] + \frac{L}{2R}[1 - e^{-(2R/L)\tau}]\right) \tag{11}$$

For a slim coil, i.e. $h >> \sqrt{S}$, where h is the coil height, the inductance L of the coil is given by $$L \approx \frac{\mu_0 S N^2}{h} \tag{12}$$

It is useful to express the total energy W delivered to the load in terms of the stored magnetic energy $W_M$. The stored magnetic energy $W_M$ may be expressed as $$W_M = \frac{B_1^2 S h}{2\mu_0} \tag{13}$$

Hence, substituting appropriate values into Eq(13), it is seen that the energy delivered to the load is $$W = W_M \frac{2L}{\tau R}\left(1 - \frac{2L}{R\tau}\left(1 - \exp\left(-\frac{R}{L}\tau\right)\right) + \frac{L}{2R\tau}\left(1 - \exp\left(-\frac{2R}{L}\tau\right)\right)\right) \tag{14}$$

The delivered energy has a broad maximum at around $\tau R/L \simeq 2$. With this value, it is seen that $$W = 0.367 \times W_M \tag{15}$$

and the power at $t = \tau$ is given by $$P = W_M \times 0.75 \tau^{-1} \tag{16}$$

For example, assume the following values:

$w = 5 \times 10^{-2} m;\ h = 0.1 m;\ B_1 = 0.5 T;\ \text{and}\ \tau = 10^{-5}\ \text{sec}.$ With these values, it is seen that
$W_M = 25$ J,
$W = 9.2$ J, and
$P = 1.875 \times 10^6$ W.

As seen in the above example, a significant amount of power (approximately 1.9 MW) may be recovered upon the explosive destruction of the permanent magnet 42. This power may be even greater where a composite magnet/explosive is used as shown in FIG. 4. This power may be used to not only power an appropriate transmitter, but also to destroy (render inoperable) many types of radio receivers that may be near the transmitting location.

The simplest transmitter is Marconi's original spark transmitter. Such transmitter includes a spark gap 54 (FIG. 3A). When sufficient voltage develops across the spark gap 54, a current arcs across the spark gap, causing a broad band signal to be emitted from the antennae 56. The duration of the transmission is for $\tau$ seconds, where $\tau$ is the transit time of the shock wave across the width of the magnet, as expressed above in Equation (5), or the destruction time of the magnet. If shorter transmission times are desired, and if a more narrow band emission is desired, such can be achieved as explained below in connection with FIGS. 6A and 6B.

Figure 5:
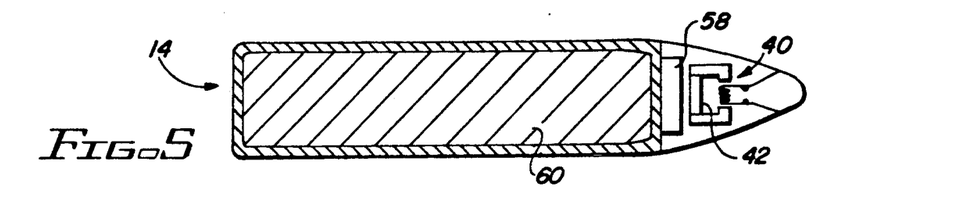
FIG. 5 schematically illustrates an exploding projectile having the electromagnetic tracer of FIG. 3A carried therein.

FIG. 5 schematically illustrates an exploding projectile 14 having the electromagnetic tracer 40 of FIG. 3A carried therein. As seen in FIG. 5, the bulk of the projectile 14 is filled with an explosive material 60. A proximity fuse 58 senses when the projectile is within a prescribed distance of the target and triggers the explosion of the explosive material 60. For the configuration shown in FIG. 5, the tracer 42 is carried near the front of the projectile 14, with the permanent magnet 42 being positioned closest to the explosive material 60. In this way, the permanent magnet 42 receives the resulting shock wave first, releasing the stored magnetic energy (manifest by the sudden decrease of magnetic flux in the air gap 50) that powers the transmission of the RF burst.

It is noted that while FIG. 5 shows the electromagnetic tracer 40 positioned in the tip, or front, of the projectile 14, it could also be positioned to the rear of the projectile 14. Other configurations are also possible. All that is required is that the magnet 42 be positioned nearer to the explosives 60 than is the coil 46 so that the magnet is destroyed first by the shock waves resulting from the explosion of the explosives.

In some embodiments of the invention, it is desirable to charge a capacitor with the power developed in the coil 54. The charging time of such capacitor is $\tau$ seconds, see Equation (5), but the discharge time of such capacitor can be made much shorter.

Figure 6A:
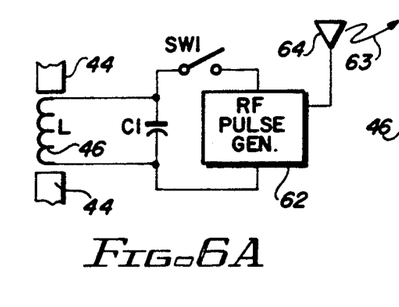
FIG. 6A is an electrical schematic block diagram illustrating an alternative manner of generating a high power RF pulse.

In FIG. 6A, for example, a capacitor C1 is charged with the power developed in the coil 46. The charged capacitor C1 is then used to power an RF pulse generator 62. When thus powered, the RF pulse generator 62 transmits a desired RF pulse, represented as the wavy arrow 63, from a suitable antenna 64. Advantageously, the RF pulse generator 62 may be a suitable solid state transmitter that emits a narrow band RF transmission (as opposed to the broad band transmission obtained from the spark gap transmitter shown in FIG. 3A). As needed, a switch SWI, coupled to rapidly close only when the charge on the capacitor C1 reaches a prescribed level, may be employed between the capacitor C1 and the RF pulse generator. Such switch may be realized, e.g., with an inexpensive spark gap switch or an SCR. It is noted that some types of RF transmitters would not require such a switch, as they would automatically begin operation as soon as the power stored on the capacitor C1 reached a prescribed level. It is further noted that for high power microwave generation, the generator 62 shown in FIG. 6A may be a soliton generator.

Figure 6B:
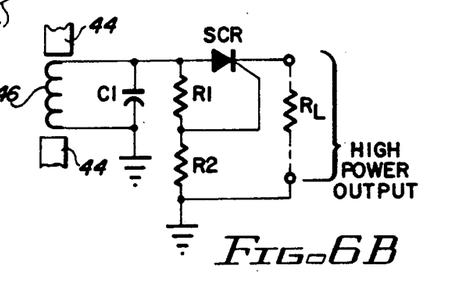
FIG. 6B is an electrical schematic diagram illustrating one manner in which the output power from the electromagnetic tracer of the present invention may be increased.

In FIG. 6B, an alternative embodiment of the transmitter portion of the invention is illustrated. This embodiment advantageously increases the output power available from the electromagnetic tracer 40 by discharging the capacitor C1 in a shorter period of time than is used to charge the capacitor C1. A voltage divider network, or equivalent circuit, comprising resistors R1 and R2, provides a control voltage that triggers a silicon controlled rectifier (SCR), or equivalent (such as a spark gap switch), only after the charge on the capacitor C1 has reached its maximum value (or near its maximum value). Once triggered, the SCR or other switch dumps the charge on the capacitor C1 to a load, e.g., $R_L$. Advantageously, the value of $R_L$ can be controlled relative to the value of the capacitor C1 so that the discharge time can be made much shorter than the charging time, $\tau$, thereby significantly increasing the available output power.

For example, for the L-C circuit comprising the coil 46 and the capacitor C1, the charge on the capacitor C1 and the current, I, in the circuit, may be expressed as $$Q = C\,V_0(1 - \cos\omega t) \tag{17}$$

and $$I = \omega V_0 \sin\omega t, \tag{18}$$

where Q is the charge, C is the capacitance value of C1, and $\omega = (LC)^{\frac{1}{2}}$.

By choosing $\omega\tau = \pi$, the capacitor C1 is charged to the voltage $V_c$ given by $$V_c = 2V_0 \tag{19}$$

The stored energy of the capacitor $W_c$ is given by $$W_c = 2CV_0^2 = \left(\frac{2}{\pi}\right)^2 W_M \qquad (20)$$

The factor $(2/\pi)$ is the result of the assumption of linear decay of the magnetic field due to the explosive destruction of the permanent magnet.

As indicated above, the capacitor may be discharged through an appropriate switch, e.g., a spark gap switch. The discharge time depends on the load circuitry. For a short discharge time, the peak power is much greater than that expressed in Equation (16). For example, for a discharge time of $10^{-7}$ seconds, a peak power of up to 100 MW is possible. While the use of a capacitor increases the volume and the weight of the system, because the capacitor must store a substantial fraction of the stored magnetic energy, such a dramatic increase in available output power often justifies the increase in volume and weight.

As thus described, it is seen that the present invention provides an electromagnetic tracer wherein large amounts of energy are stored for indefinite periods of time (i.e., exhibiting an almost infinite shelf-life). This stored energy is released upon the explosive destruction of the electromagnetic tracer, and this released energy, in turn, powers the transmission of an RF pulse to signal the occurrence and location of such explosive destruction.

Advantageously, as described, the RF pulse thus generated may be transmitted using either a broad or narrow band transmitter.

Further, the power contained in the transmitted RF burst or pulse is sufficiently large to destroy (render inoperable) other RF receivers in the burst vicinity. Hence, the electromagnetic tracer serves two important functions: (1) it identifies the location of the exploding projectile in which it is carried at the time of its impact, and (2) it destroys or renders inoperable any receivers proximate the impact location It is also seen that the electromagnetic tracer of the present invention may be compact in its construction, and simple and reliable in its operation. Hence, it can be economically used in an explosive projectile where it is only used once prior to being destroyed.

It is further noted that while the primary application for the electromagnetic tracer described herein is as a war-time military device, i.e., to determine the impact location of an exploding projectile without the need for risk forward observers, there are clearly other, non-military, applications for the invention. For example, law enforcement agencies may wish to trace a container of contraband in which the electromagnetic tracer of the present invention is concealed, which container may be remotely triggered for destruction. Further, some research applications may dictate the need to remotely and inexpensively generate a large RF burst, e.g. to study the effects of various types of atmospheres or other conditions associated with RF transmission. The present invention advantageously lends itself to any application wherein a large amount of stored electromagnetic energy is remotely released, and then used to power an appropriate RF transmission or other electronic or optical function or device.

While the invention herein disclosed has been described by means of specific embodiments and applications thereof, numerous modifications and variations could be made thereto by those skilled in the art without departing from the scope of the invention set forth in the claims.

What is claimed is:

1. A method of generating a high power RF pulse upon the triggering of an explosive source, said method comprising the steps of;
    (a) storing electromagnetic energy at a location proximate the explosive source by interspersing an explosive powder throughout a permanent magnet and establishing a magnetic circuit using said permanent magnet and a ferromagnetic core, said magnetic circuit having a constant magnetic flux flowing therethrough;
    (b) releasing said electromagnetic energy with energy made available upon the triggering of the explosive source; and
    (c) powering a pulse generator with said released electromagnetic energy, said pulse generator being located more distant from said explosive source than is said stored electromagnetic energy, said powered pulse generator generating and transmitting a high power RF pulse prior to the time the energy released by said explosive source reaches and destroys said pulse generator.

2. The method of generating a high power RF pulse as set forth in claim 1 wherein step (b) includes
    rapidly raising the temperature of the permanent magnet above its Curie point with energy released upon the triggering of said explosive source, whereupon said constant magnetic flux flowing through said magnetic circuit changes rapidly; and
    sensing said rapid change in magnetic flux.

3. The method of generating a high power RF pulse as set forth in claim 2 wherein the step of sensing said rapid change in magnetic flux comprises coupling a coil to said magnetic circuit so that said magnetic flux flows through said coil, and sensing a voltage induced in said coil by the rapid change in said magnetic flux.

4. A high power RF generator for use with a source of explosive energy, said high power RF generator comprising:
    means for storing electromagnetic energy at a location near said source of explosive energy, said means for storing electromagnetic energy including a permanent magnet;
    means for releasing said electromagnetic energy with released energy from said explosive energy, said means for releasing said electromagnetic energy comprising
        a ferromagnetic core coupled to said permanent magnet, said ferromagnetic core having an air gap located a prescribed distance from said permanent magnet, and
        a coil positioned within said air gap,
        said air gap having a magnetic flux density therein of a magnitude determined by a magnetic circuit comprising said permanent magnet and said ferromagnetic core,
        said magnetic flux density flowing through said coil and inducing a voltage potential across said coil whenever said magnetic flux density changes,
        a capacitor for first storing and second discharging the energy contained within said induced voltage potential,
        the magnitude of said induced voltage potential being the greatest when said magnetic flux density changes rapidly as a result of the explosive destruction of said permanent magnet by said source of explosive energy, the induced voltage potential resulting from the explosive destruction of said permanent magnet representing the release of the electromagnetic energy from said permanent magnet; and transmitting means powered by said released electromagnetic energy for transmitting an RF pulse, said transmitting means being located farther from said source of explosive energy than is said stored electromagnetic energy, said powered transmitting means generating and transmitting said RF pulse prior to the time said released explosive energy reaches and destroys said transmitting means.

5. The high power RF generator as set forth in claim 4 further including means for discharging said capacitor at a faster rate than the energy contained within said induced voltage potential is stored within said capacitor.

6. A high power RF generator comprising:

a source of explosive energy;

means for storing electromagnetic energy at a location near said source of explosive energy, said means for storing electromagnetic energy including a permanent magnet, said source of explosive energy including an explosive powder that is interspersed throughout said permanent magnet;

means for releasing said electromagnetic energy with released energy from said explosive energy;

transmitting means powered by said released electromagnetic energy for transmitting an RF pulse, said transmitting means being located farther from said source of explosive energy than is said stored electromagnetic energy, said powered transmitting means generating and transmitting an RF pulse prior to the time said released explosive energy reaches and destroys said transmitting means.

7. The high power RF generator as set forth in claim 6 wherein said means for releasing said electromagnetic energy comprises a ferromagnetic core coupled to said permanent magnet, said ferromagnetic core having an air gap located a prescribed distance from said permanent magnet, and a coil positioned within said air gap, said air gap having a magnetic flux density therein of a magnitude determined by a magnetic circuit comprising said permanent magnet and said ferromagnetic core, said magnetic flux density flowing through said coil and inducing a voltage potential across said coil whenever said magnetic flux density changes, the magnitude of said induced voltage potential being the greatest when said magnetic flux density changes rapidly as a result of the destruction of said permanent magnet by released energy from said source of explosive energy, the induced voltage potential resulting from the explosive destruction of said permanent magnet representing the release of the electromagnetic energy from said magnet.

8. The high power RF generator as set forth in claim 7 wherein said means for releasing said electromagnetic energy further comprises a capacitor for first storing and second discharging the energy contained within said induced voltage potential.

9. The high power RF generator as set forth in claim 8 further including means for discharging said capacitor at a faster rate than the energy contained within said induced voltage potential is stored within said capacitor.

* * * * *

UNITED STATES PATENT AND TRADEMARK OFFICE
CERTIFICATE OF CORRECTION

PATENT NO. : 5,125,104
DATED : June 23, 1992
INVENTOR(S) : Ohkawa

It is certified that error appears in the above-identified patent and that said Letters Patent is hereby corrected as shown below:

Column 7, line 35 (Equation 1) after "$1_2$" insert -- = --. Column 8, line 63 (Equation 14) change the second occurrence of "{ " to --[--. Column 9, line 13 (Equation 16) insert --.-- after "$\tau^{-1}$". Column 10, line 20, change "SWI" to --SW1--. Column 10, line 62, change "$(LC)^{\frac{1}{2}}$" to --$(LC)^{-\frac{1}{2}}$--. Column 11, line 40, after "location" insert --.--.
<u>IN THE CLAIMS:</u> Column 12, line 6 (Claim 1) change ";" to --:--. Column 13, line 37 (Claim 6) change "an" to --said--.

Signed and Sealed this

Twenty-fourth Day of August, 1993

Attest:

BRUCE LEHMAN

*Attesting Officer*    *Commissioner of Patents and Trademarks*